United States Patent
Palmateer et al.

(10) Patent No.: US 7,480,037 B2
(45) Date of Patent: Jan. 20, 2009

(54) SYSTEM FOR PROJECTING FLAWS AND INSPECTION LOCATIONS AND ASSOCIATED METHOD

(75) Inventors: John W. Palmateer, Gig Harbor, WA (US); Alan S. Locke, Seattle, WA (US)

(73) Assignee: The Boeing Company, Chicago, IL (US)

(*) Notice: Subject to any disclaimer, the term of this patent is extended or adjusted under 35 U.S.C. 154(b) by 98 days.

(21) Appl. No.: 11/293,443

(22) Filed: Dec. 2, 2005

(65) Prior Publication Data

US 2007/0127015 A1 Jun. 7, 2007

(51) Int. Cl.
*G01N 21/00* (2006.01)
(52) U.S. Cl. .................. 356/237.1; 356/237.2
(58) Field of Classification Search ............ None
See application file for complete search history.

(56) References Cited

U.S. PATENT DOCUMENTS

| | | | |
|---|---|---|---|
| 4,098,130 A | 7/1978 | Coffey et al. | |
| 4,417,149 A | 11/1983 | Takeuchi et al. | |
| 4,545,251 A | 10/1985 | Uchida et al. | |
| 4,699,683 A * | 10/1987 | McCowin ............ | 156/353 |
| 4,875,372 A | 10/1989 | Gilbert | |
| 5,341,183 A | 8/1994 | Dorsey-Palmateer | |
| 5,349,860 A | 9/1994 | Nakano et al. | |
| 5,388,318 A | 2/1995 | Petta | |
| 5,444,505 A | 8/1995 | Dorsey-Palmateer | |
| 5,450,147 A | 9/1995 | Dorsey-Palmateer | |
| 5,506,641 A | 4/1996 | Dorsey-Palmateer | |
| 5,651,600 A | 7/1997 | Dorsey-Palmateer | |
| 5,663,795 A | 9/1997 | Rueb | |
| 5,671,053 A | 9/1997 | Wigg et al. | |
| 6,017,125 A | 1/2000 | Vann | |
| 6,064,429 A | 5/2000 | Belk et al. | |
| 6,070,466 A | 6/2000 | Taran et al. | |
| 6,120,446 A | 9/2000 | Ji et al. | |
| 6,480,271 B1 | 11/2002 | Cloud et al. | |
| 6,639,660 B1 * | 10/2003 | Beck et al. ............ | 356/237.2 |

(Continued)

FOREIGN PATENT DOCUMENTS

GB 1590571 6/1981

(Continued)

OTHER PUBLICATIONS

PCT Notification of Transmittal of the International Search Report and the Written Opinion of The International Searching Authority, or the Declaration, mailed Nov. 30, 2006 for PCT/US2006/034114 (Filed Aug. 29, 2006).

(Continued)

*Primary Examiner*—Michael P Stafira
(74) *Attorney, Agent, or Firm*—Alston & Bird LLP

(57) ABSTRACT

A system and method for projecting an image onto a workpiece are provided. The system includes a data system capable of providing information indicative of a flaw within the workpiece, wherein the information is based on data acquired by at least one sensor. The system also includes an image-projecting device in communication with the data system and capable of projecting an image indicative of the flaw onto the workpiece, as well as a plurality of encoders for determining a location and/or orientation of the image-projecting device.

23 Claims, 3 Drawing Sheets

U.S. PATENT DOCUMENTS

| | | | |
|---|---|---|---|
| 6,694,164 B2 * | 2/2004 | Glossop | 600/407 |
| 7,193,696 B2 * | 3/2007 | Engelbart et al. | 356/237.1 |
| 2004/0189944 A1 | 9/2004 | Kaufman et al. | |
| 2005/0058332 A1 | 3/2005 | Kaufman et al. | |
| 2005/0082262 A1 | 4/2005 | Rueb et al. | |
| 2005/0121422 A1 | 6/2005 | Morden et al. | |

FOREIGN PATENT DOCUMENTS

| | | | |
|---|---|---|---|
| GB | 2143423 A | 2/1985 | |
| JP | 6273349 A | 9/1994 | |
| JP | 10 221308 | 8/1998 | |

OTHER PUBLICATIONS

International Search Report for PCT/US2006/045851, completed on Apr. 13, 2007.

Written Opinion for PCT/US2006/045851, completed on Apr. 13, 2007.

* cited by examiner

SYSTEM FOR PROJECTING FLAWS AND INSPECTION LOCATIONS AND ASSOCIATED METHOD

BACKGROUND OF THE INVENTION

1) Field of the Invention

The present invention relates to optical-projection systems and, more particularly, to an optical-projection system for projecting flaws and inspection locations during the manufacture or assembly of a workpiece.

2) Description of Related Art

One method and device for assisting in the measurement of a workpiece includes the use of an image-projecting device, such as a laser projector, which projects a laser beam upon the workpiece to define particular locations at which to inspect the workpiece. Furthermore, image-projecting devices have been employed to aid workers during assembly and inspection of a workpiece. For instance, the image-projecting device could project the location of laminate plies for an aircraft fuselage or a template or outline of the part to be assembled.

Therefore, controlling or monitoring the orientation and location of the image-projecting device is required in order to accurately project the image onto the workpiece. Traditionally, projection technology either requires the measurement of reference points on the object being projected or a secondary measurement system to establish reference points if the references are arranged beyond the field-of-view of the image-projecting device. For example, U.S. Patent Application Publication No. 20050121422 to Morden et al. discloses a laser projection system that modifies the data stored in the computer associated with the laser projection of the as-designed workpiece to provide for projection of a laser image on the workpiece in the as-built condition. In particular, Morden employs a digital scanner and laser projector that are each mounted on a frame assembly having metrology receivers and reflective targets for determining the location of the scanner and projector relative to a respective frame assembly. Thus, the laser projection system is essentially "targetless," as the workpiece does not require targets within the field-of-view of the digital scanner or laser projector, notwithstanding reflective targets on the frame assembly.

Additionally, U.S. Patent Application Publication No. 20040189944 to Kaufman et al. discloses a method and system for visualizing deviations on an actual surface. More specifically, Kaufman discloses visualizing surface shape errors by optically projecting a pattern outlining the areas that deviate from a desired design onto the surface. The system utilizes a laser tracker in conjunction with a retro-reflective element and reference points associated with the surface to produce a three-dimensional point cloud of data points that provide a spatial profile of the actual surface. The same reference points used by the laser tracker can also be measured by the image projecting device for computing its orientation and location. The point cloud is compared to a nominal surface, and a deviation is computed and transformed into a two-dimensional topographical map for projecting onto the surface with an optical projector.

Although techniques have been developed to determine differences between an as-designed periphery and an as-built periphery for assembly or locating areas on the workpiece for other purposes, such as painting, applying decals, etc., image-projecting systems are typically not employed to locate flaws on or within a workpiece. For example, typical projection systems are not employed to locate cracks, discontinuities, voids, or porosity, which could adversely affect the performance of the workpiece. Furthermore, typical image-projection systems are incapable of being used during manufacturing, such as during tape laying of composite plies onto a workpiece, to validate the integrity and fitness of the workpiece. Additionally, typical image-projection systems are incapable of being used to record feedback at the workpiece surface, such as information regarding the workpiece being inspected.

It would therefore be advantageous to provide an optical-projection system that is capable of locating flaws on or within a workpiece. In addition, it would be advantageous to provide an optical-projection system that is capable of locating flaws on or within the workpiece during a manufacturing process without requiring measurement of reference points. It would also be advantageous to project information indicative of the type of flaw on or within the workpiece. Furthermore, it would be advantageous to provide an optical-projection system that locates flaws and is capable of providing feedback regarding flaws on or within a workpiece.

BRIEF SUMMARY OF THE INVENTION

Embodiments of the invention may address at least some of the above needs and achieve other advantages by providing an optical-projection system that is capable of locating information characterizing at least a portion of the workpiece and projecting an image indicative of the characterized portion onto the workpiece. In particular, the system is capable of receiving information from one or more sensors that acquire information indicative of the workpiece or accessing a database storing information indicative of the workpiece, such as for characterizing flaws, and an image-projecting device for projecting an image that locates the flaw on the workpiece. As such, flaws may be readily identified and located for technicians to repair/replace a portion of the workpiece or to assemble/reassemble the workpiece.

In one embodiment of the present invention, an optical-projection system is provided. The system includes a data system capable of providing information indicative of a flaw within the workpiece, wherein the information is based on data acquired by at least one sensor. Additionally, the system includes an image-projecting device (e.g., laser projector or digital projector) in communication with the data system (e.g., data acquisition system or database) for projecting an image indicative of the flaw onto the workpiece. The system further includes a plurality of encoders for determining a location and/or orientation of the image-projecting device. The workpiece is typically free of projector-locating devices (e.g., reference targets).

According to various modifications of the system of the present invention, the system also includes one or more projector-locating devices for determining a location and/or orientation of the image-projecting device. The projector-locating device could be a frame including targets, wherein the image-projecting device is capable of measuring the targets and determining its location and/or orientation. The image-projecting device and frame may be attached to a translatable gantry, or may be positioned proximate to a tape lamination head adjacent to the gantry. The system could also include at least one coded reflective device for providing feedback indicative of the flaw to the data system in response to interaction with the projected image.

Additional variations of the system provide a data system that is capable of providing location information, as well as information indicative of the flaw. Furthermore, the image-projecting device may be capable of projecting an image indicative of both the location of the flaw onto the workpiece, as well as an image indicative of the flaw such as an image about a periphery of the flaw and/or an image indicative of a specific type of flaw.

Other aspects of the present invention also provide a method for projecting an image onto a workpiece. The method includes providing information indicative of a flaw within the workpiece. The method further includes determining a location and/or orientation of an image-projecting device with a plurality of encoders, and projecting an image indicative of the flaw onto the workpiece with the image-projecting device. The method could also include laying tape onto a mandrel to form at least a portion of the workpiece such that images may be projected onto the workpiece during manufacturing of the workpiece. Moreover, the method could include providing feedback indicative of the flaw with at least one coded reflective device in response to interaction with the projected image.

In various aspects of the method, the projecting step includes projecting an image representative of a location of the flaw on the workpiece. For instance, the projecting step may include projecting a polygonal image about a periphery of the flaw with the image-projecting device and/or projecting an image indicative of a specific type of flaw. In addition, the providing step could include providing location information indicative of the flaw, such as coordinates of the flaw. The providing step could include accessing information indicative of the workpiece from a data system. The determining step could include determining the location and/or orientation of the image-projecting device with at least one projector-locating device.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
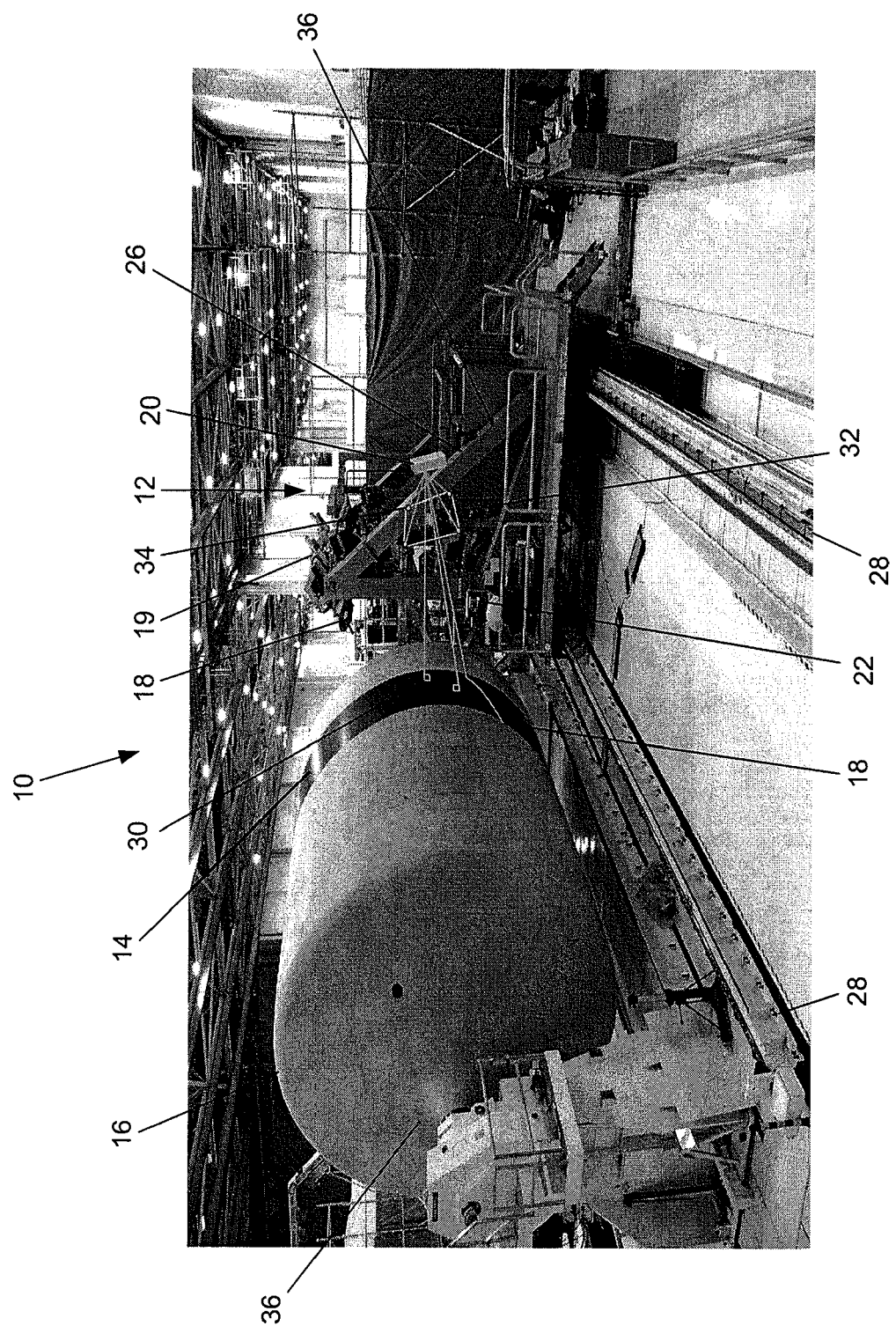
FIG. 1 is a perspective view of an optical-projection system according to one embodiment of the present invention.

Referring now to the drawings and, in particular to FIG. 1, there is shown an optical-projection system for identifying and locating flaws on or within a workpiece. The system 10 of the illustrated embodiment includes a multi-headed tape lamination machine 12 ("MHTLM") that is employed to wind tape 14 about a mandrel 16 to form a workpiece, such as an aircraft fuselage. Sensors 18 are carried by the MHTLM 12 and are positioned to acquire data indicative of the workpiece as tape 14 is being laid upon the mandrel. In addition, the system 10 includes an image-projecting device 20 that is capable of projecting an image 30 onto the workpiece that is used to locate a portion of the workpiece identified by the sensors 18. The sensors 18 and image-projecting device 20 are in communication with a data system 22 such that the data system may provide and/or process data acquired by the sensors for the image-projecting device. For example, the data system 22 could provide location information of a flaw detected by the sensors 18, and the image-projecting device 20 may project an image onto the workpiece indicative of the flaw. The term "flaw," as used herein, is not meant to be limiting, as a flaw could be any imperfection, defect, or feature in the workpiece that may require attention by a technician, such as for repair or replacement of the workpiece or a portion of the workpiece.

The optical-projection system 10 could be used to inspect any number of workpieces in a variety of industries where detection of flaws or defects in the workpiece is required or desired, such as in the aircraft, automotive, or construction industries. Furthermore, the system 10 could be used during the assembly of the workpiece or thereafter for providing locations on the workpiece for measurement or additional manufacturing operations, such as for locating ply boundaries during tape lamination of the workpiece.

The term "workpiece" is also not meant to be limiting, as the optical-projection system 10 could be used to inspect any number of parts or structures of different shapes and sizes, such as machined forgings, castings, or panels. Therefore, although a MHTLM 12 is illustrated in FIG. 1 for laying tape 14 onto a workpiece, the system 10 could be employed to inspect various workpieces. For instance, the inspection could be performed on newly manufactured structures or existing structures that are being inspected for preventative maintenance purposes. Further, the workpiece could be any number of composite and/or metallic materials.

Referring to the illustrated embodiment, the MHTLM 12, as known to those skilled in the art, generally includes a gantry 26 and a plurality of tape heads 19 for laying down tape 14 of composite material. The gantry 26 is capable of translating along rails 28 50 that tape 14 is laid as the mandrel 16 rotates and longitudinally as the gantry translates. However, the term "MHTLM," as used herein, is not meant to be limiting, as any numerically controlled machine or manually operated machine with encoders on its axes of motion could be used. There may be any number of machine encoders positioned on any moving part of the MHTLM 12, such as the mandrel 16, the gantry 26, and the tape heads 19. For example, FIG. 1 illustrates that the mandrel 18 and gantry 26 may have one or more encoders 36 positioned thereon. The machine encoders are capable of determining the orientation and position of respective parts of the MHTLM.

The image-projecting device 20 could be any device capable of projecting a visible image 30 onto the workpiece. For instance, the image-projecting device 20 could be a laser projector or a digital projector. The image-projecting device 20, such as a laser projector, includes galvanometers for directing the projected image 30 to the desired coordinates. The image-projecting device 20 is attached to the gantry 26 such that the image-projecting device may translate with the gantry as tape 14 is laid up with the tape heads 19. In particular, the image-projecting device 20 is mounted above and behind the MHTLM operator's station, as shown in FIG. 1, although the image-projecting device could be located at various positions and still be capable of projecting an image onto the workpiece. Rotation of the mandrel 16 allows the image-projecting device 20 to remain stationary with respect to the gantry 26, yet project an image approximately perpendicular to the surface of the workpiece. Thus, errors resulting from projection uncertainty (i.e., how the image-projecting device points), surface uncertainty, and uncertainty in any reference targets may be reduced. Although only a single image-projecting device 20 is depicted in FIG. 1, there could be more than one image-projecting device attached to the gantry 26 and in communication with the data system 22 if desired.

The location and orientation of the image-projecting device 20 with respect to the gantry 26 and, in turn, the workpiece may be determined using machine encoders. Machine encoders may be employed to monitor the position of various components of the MHTLM 12, as described above. Thus, by determining the position and orientation of the various components of the MHTLM 12, the location and/or orientation of the image-projecting device 20 may be determined. By determining the location and/or orientation of the image-projecting device 20 using the machine encoders, the location of projection of an image on the workpiece may also be determined.

If additional accuracy is required, various projector-locating devices may be used to determine the location and orientation of the image-projecting device 20, such as retroreflective targets or a frame 32 having retroreflective targets 34 attached thereto, as depicted in FIG. 1. Retroreflective targets, as known to those skilled in the art, reflect light back to the image-projecting device 20 in approximately the opposite direction that it was projected, and the image-projecting device includes power detectors that detect the intensity of the light returned by the retroreflective targets and generate coordinates of the retroreflective targets. Machine encoders may be employed to monitor the position of various components of the MHTLM 12, as described above. Thus, by determining the location and/or orientation of the various components of the MHTLM 12, the location of the retro-reflective targets 34 may be determined with respect to the workpiece.

The image-projecting device 20 is capable of projecting onto a plurality of retroreflective targets 34 to obtain the location and orientation of the image-projecting device with respect to the position of the gantry 26. Thus, the coordinates of the retroreflective targets 34 that are generated based on the reflected light may be correlated with the known location of the targets, and the position and orientation of the image-projecting device 20 can be determined. Use of retroreflective targets may depend on the acceptable tolerance of the position of the image-projecting device 20 determined by the machine encoders. A primary source of pointing error for the image-projecting device 20 is its orientation, so the potential use of retroreflective targets, whose primary error is location (i.e., displacement) can ameliorate the orientation error of the image-projecting device. Moreover, the distance between the image-projecting device 20 and the mandrel 16 is typically taken into account for accurately projecting the coordinates generated by the data system 22 onto the workpiece.

As shown in FIG. 1, the frame 32 is attached to the gantry 26 and includes four retroreflective targets, although any number of targets may be employed. In addition, although the image-projecting device 20 is typically stationary with respect to the gantry 26, the image-projecting device could include an actuator for moving the image-projecting device and encoders to monitor the movement of the device. Therefore, the workpiece is "targetless," as the location and orientation of the image-projecting device 20 may be determined without including reference targets on the workpiece. In addition, the field-of-view of the image-projecting device 20 may be smaller than the workpiece since the image-projecting device may be calibrated independent of the size of the workpiece. The image-projecting device 20 can typically project any position of the mandrel 16 and gantry 26.

Various types of sensors 18 may be used to inspect the workpiece. The sensors 18 communicate with a data system 22. The data system 22 could include a processor or similar computing device operating under the control of imaging software so that any flaws or defects in the workpiece may be characterized. Alternatively, the data could be stored in a memory device associated with the data system 22 for subsequent review and analysis. Thus, the data system 22 could simply be a database for storing location information and/or data indicative of a flaw, such that the information may accessed at a later time. The data system 22 is capable of generating data and/or images indicative of a flaw and may also allow a user to store and edit previously generated data and/or images. However, it is understood that the data system 22 need not generate images, as the data system could mathematically collect and analyze data and generate, for example, location information, and transmit the information to the image-projecting device 20.

Figure 2:
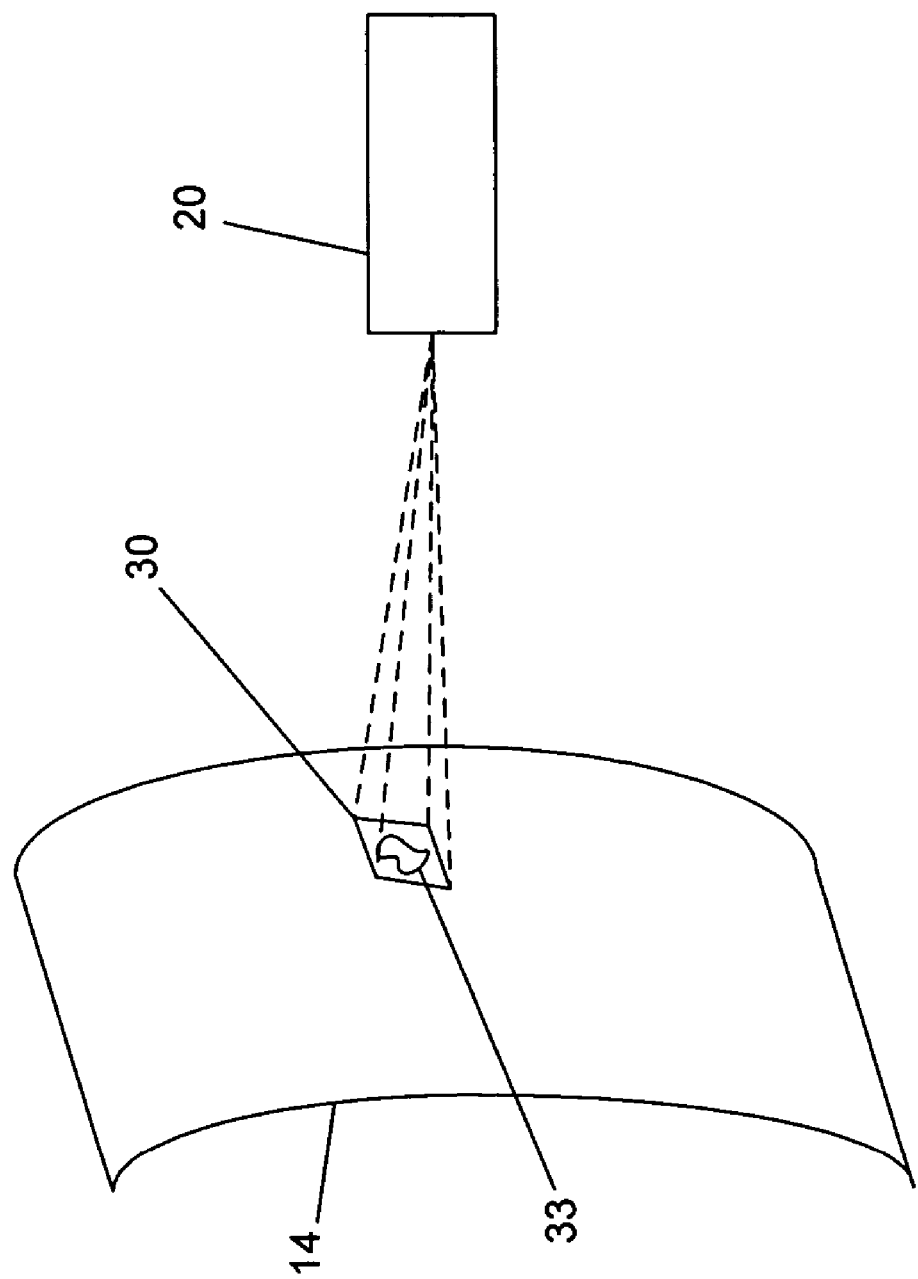
FIG. 2 is an elevation view an image projected on a workpiece about the periphery of a flaw according to another embodiment of the present invention.

The image-projecting device 20 is capable of projecting an image 30 indicative of a flaw onto the workpiece. For example, the image-projecting device 20 may project an image outlining the periphery of a flaw. Thus, the image 30 could be various polygonal configurations, such as a diamond or rectangle, or any other boundary (e.g., circular) that is capable of circumscribing a flaw. As a result, any flaws identified by the sensors 18 and characterized by the data system 22 may be readily located by technicians for repair or replacement. Furthermore, the configuration of the image 30 can be used to indicate the character (i.e., classification) and/or type of the flaw. For example, a square could indicate one type of flaw, while a circle could indicate a second type of flaw. FIG. 2 illustrates an image-projecting device 20 projecting a polygonal image 30 about a flaw on a workpiece, such as wrinkled tape 14 being laid up on a mandrel 16. The polygonal image 30 outlines and may classify a flaw 33 that has been detected and characterized by the data system 22.

It is understood that the image-projecting device 20 could be employed to project any desired image on the workpiece. For example, the image-projecting device 20 could project an image on the workpiece depicting the flaw itself. Moreover, the image-projecting device 20 could project an image having various colors, such as for identifying a particular type or severity of a flaw. The image-projecting device 20 is also capable of projecting any number and sizes of images 30 within a single field-of-view depending on the number of flaws detected by the sensors 18.

Therefore, in order to accurately project an image onto the workpiece for repair or replacement, the data system 22 typically provides the image-projecting device 20 with coordinates of the flaws. Various techniques may be employed by the data system 22 to generate coordinates of a flaw and utilize the coordinates for projecting an image indicative of the flaw onto the workpiece with the image-projecting device 20. For example, when flaws are detected with the sensors 18, the location of the flaws is converted into part coordinates on the mandrel 16 (i.e., flaws viewed on a CAD model). These locations may be transmitted to the image-projecting device 20 as X, Y, and Z part coordinates via the data system 22. More specifically, given the position of the gantry 26 and the roll angle of the mandrel 16, the positions of the retroreflective targets 34 on the frame 32 may be converted into part coordinates for any position of the mandrel and gantry. Computing the image-projecting device's 20 location and orientation based on the measured retroreflective targets 34 converts the image-projecting device into relative part coordinates, thus allowing the projection of flaws onto the workpiece. In other words, this coordinate scheme utilizes flaw locations (i.e., flaws in part coordinates) and a changing reference system based on gantry 26 position and mandrel 16 rotation.

Another exemplary technique that could be employed to accurately depict an image outlining a flaw on a workpiece includes transmitting information detected by the sensors 18 to the data system 22 and converting location information of the flaws into gantry coordinates with the data system based on the position of the gantry 26 and rotation angle of the mandrel 16. When the gantry 26 and mandrel 16 are moving, the X, Y, and Z coordinates of the flaws are transmitted to the image-projecting device 20 via the data system 22. The location and orientation of the image-projecting device 20 are in gantry coordinates, as described above based on the retroreflective targets 34 located on the frame 32, and the data system 22 can provide the image-projecting device with relative gantry coordinates to project the image of the flaws on the workpiece. Thus, this coordinate technique uses changing flaw locations since the flaws in gantry coordinates change with the position of the gantry 26 and rotation of the mandrel 16 in conjunction with a fixed reference system based on the position of the image-projecting device 20.

Projecting an image onto the workpiece with the image-projecting device 20 is typically performed while the mandrel 16 and gantry 26 are stationary. Thus, the number of stationary positions required to inspect the workpiece will depend on the size of the mandrel 16 and the field-of-view of the image-projecting device 20. For example, the field-of-view of the image-projecting device 20 could correspond to each 90° rotation of the mandrel 16. However, it is understood that images could be projected onto the workpiece in real-time or near real-time as tape 14 is laid up on the mandrel 16 with the MHTLM 12.

The image-projecting device 20 is also capable of providing feedback to the data system 22 in response to interaction with a coded reflective device(s). For example, the image-projecting device 20 could include power detection circuitry that can be triggered using a retroreflective target or by the same power detectors that detect the intensity of the light returned by the retroreflective targets. When a flaw location is projected, various coded reflective devices, such as retroreflective material or multiple pieces of retroreflective material (similar to a barcode) may be positioned in the projection, and the detection of the power return at a specific flaw can cause the image-projecting device 20 to communicate information regarding the flaw to the data system 22, such as the type of flaw or corrective action that may need to be taken. Thus, the feedback to the data system can be used to indicate the disposition of the flaw for record keeping or for repair/replacement at a later time. For example, a flaw location that does not contain a flaw or contains a repaired flaw may be communicated back to the data system 22 with a specific retroreflective "barcode" that indicates that a flaw does not exist, while other classification of flaws (e.g., a flaw requiring additional repair) will use their own retroreflective barcode. As a result, an operator may easily disposition a flaw that is being projected without having to manually input information regarding the flaw.

Figure 3:
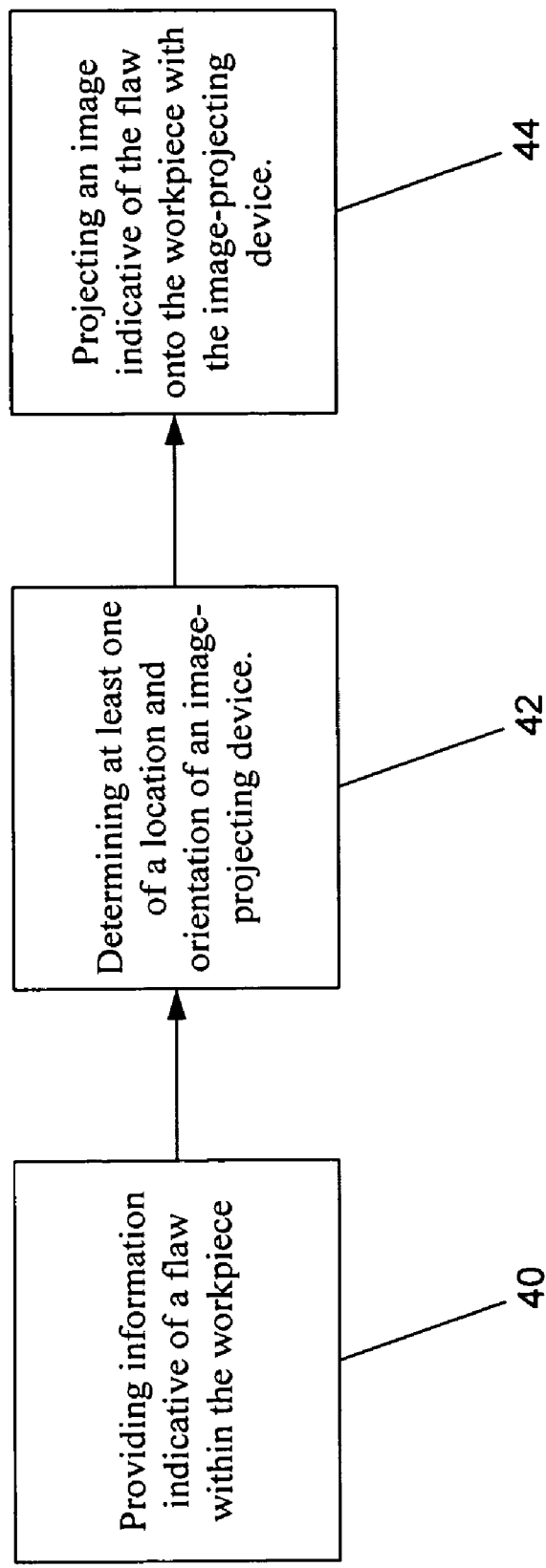
FIG. 3 is a flowchart illustrating a method for projecting an image onto a workpiece according to one embodiment of the present invention.

FIG. 3 shows a method for projecting an image onto a workpiece according to one embodiment of the present invention, where the image is indicative of a flaw on the workpiece. For example, data is provided, typically from the data system 22, that is indicative of the workpiece being inspected (block 40). Encoders and/or a projector-locating device are used to determine the location orientation of an image-projecting device (block 42). The image-projecting device 30 is capable of projecting an image indicative of the flaw onto the workpiece (block 44).

Thus, the present invention provides several advantages. The optical-projection system 10 provides techniques for locating flaws on a workpiece by projecting an image indicative of the location of the flaw on the workpiece. The coordinates of the flaws may be identified and used to project an image onto the workpiece automatically. As such, flaws may be readily located and identified so that remedial steps to repair, replace, or remediate the affected area may be taken. Moreover, the optical-projection system 10 is capable of utilizing a workpiece that is free from projector-locating devices (i.e., reference targets), including instances where the field-of-view of the image-projecting device 20 is smaller than the workpiece. Thus, the optical-projection system 10 is not limited by the size of the workpiece, and flaws that are in machine coordinates are capable of being projected with the image-projecting device 20 by correlating the machine coordinates with the location and orientation of the image-projecting device. Furthermore, the optical-projection system 10 is capable of characterizing and locating flaws on or within the workpiece as the workpiece is manufactured. Therefore, the optical-projection system 10 may provide real-time or near real-time feedback for efficiently inspecting the workpiece. Additionally, the image-projecting device 20 can detect retroreflective material placed in the projected image about a flaw, thus providing feedback to the data system 22.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical-projection system comprising:
  a data system capable of providing information indicative of a flaw within at least one of a metallic or composite workpiece, wherein the information comprises a location of the flaw and is based on data acquired by at least one sensor;
  an image-projecting device configured to receive the information indicative of the flaw from the data system; and
  a plurality of encoders for determining at least one of a location or orientation of the image-projecting device, wherein the image-projecting device is configured to project an image indicative of the flaw onto the workpiece based on the information indicative of the flaw and at least one of the location or orientation of the image-projecting device.

2. The system according to claim 1, wherein the data system comprises a data acquisition system for processing the data acquired by the at least one sensor or a database.

3. The system according to claim 1, wherein the image-projecting device comprises a laser projector or digital projector.

4. The system according to claim 1, further comprising at least one projector-locating device capable of determining at least one of a location or orientation of the image-projecting device.

5. The system according to claim 4, wherein the projector-locating device comprises a frame including retroreflective targets, and wherein the image-projecting device is capable of projecting an image onto the retroreflective targets.

6. The system according to claim 5, wherein the plurality of encoders are capable of determining the location of the retroreflective targets.

7. The system according to claim 5, wherein the image-projecting device and frame are attached to a translatable gantry.

8. The system according to claim 1, wherein the image-projecting device is capable of projecting an image representative of a location of the flaw on the workpiece.

9. The system according to claim 1, wherein the image-projecting device is capable of projecting an image about a periphery of the flaw on the workpiece.

10. The system according to claim 1, wherein the image-projecting device is capable of projecting an image indicative of a specific type of flaw on the workpiece.

11. The system according to claim 1, wherein the workpiece is free of projector-locating devices.

12. The system according to claim 1, further comprising at least one coded reflective device capable of providing feedback indicative of the flaw to the data system in response to interaction with the projected image.

13. A method for projecting an image onto at least one of a metallic or composite workpiece comprising:
providing information indicative of a flaw within the workpiece, wherein the information comprises a location of the flaw;
determining at least one of a location or orientation of an image-projecting device with a plurality of encoders; and
projecting an image indicative of the flaw onto the workpiece with the image-projecting device based on the information indicative of the flaw and at least one of the location or orientation of the image-projecting device.

14. The method according to claim 13, wherein projecting comprises projecting an image representative of a location of the flaw on the workpiece.

15. The method according to claim 13, wherein projecting comprises projecting an image indicative of a specific type of flaw on the workpiece.

16. The method according to claim 1, wherein providing comprises providing coordinates of the flaw.

17. The method according to claim 1, further comprising communicating the location of the flaw to the image-projecting device.

18. The method according to claim 13, wherein projecting comprises projecting a polygonal image about a periphery of the flaw with the image-projecting device.

19. The method according to claim 13, further comprising laying tape onto a mandrel to form at least a portion of the workpiece.

20. The method according to claim 13, wherein providing comprises accessing information indicative of the workpiece from a data system.

21. The method according to claim 13, further comprising providing feedback indicative of the flaw with at least one coded reflective device in response to interaction with the projected image.

22. The method according to claim 13, wherein determining comprises determining at least one of the location or orientation of the image-projecting device with at least one projector-locating device.

23. A method for projecting an image onto a workpiece comprising:
laying tape onto a mandrel to form at least a portion of the workpiece;
providing information indicative of a flaw within the workpiece;
determining at least one of a location and orientation of an image-projecting device with a plurality of encoders; and
projecting an image indicative of the flaw onto the workpiece with the image-projecting device.

* * * * *